(12) United States Patent
Kyrtsos

(10) Patent No.: US 6,209,887 B1
(45) Date of Patent: Apr. 3, 2001

(54) MICROPROCESSOR CONTROLLED VEHICLE SUSPENSION

(75) Inventor: Christos Kyrtsos, Southfield, MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/286,171

(22) Filed: Apr. 5, 1999

(51) Int. Cl.$^7$ .................................................. B60G 17/02
(52) U.S. Cl. .............................. 280/5.515; 280/124.157
(58) Field of Search ............................ 280/5.515, 5.519, 280/5.507, 5.508, 5.513, 124.157, 5.504

(56) References Cited

U.S. PATENT DOCUMENTS

| | | | |
|---|---|---|---|
| 5,020,781 | * | 6/1991 | Huang ............................ 280/124.157 |
| 5,072,965 | * | 12/1991 | Wada et al. ......................... 280/5.515 |
| 5,217,246 | * | 6/1993 | Williams et al. .................. 280/5.507 |
| 5,243,525 | * | 9/1993 | Tsutsumi et al. ................. 280/5.508 |
| 5,390,949 | * | 2/1995 | Naganathan et al. .......... 280/124.157 |
| 5,527,060 | * | 6/1996 | Kutsche .......................... 280/124.157 |
| 5,603,387 | * | 2/1997 | Beard et al. .................... 280/124.157 |

* cited by examiner

Primary Examiner—Lanna Mai
Assistant Examiner—Lynda Jasmin
(74) Attorney, Agent, or Firm—Carlson, Gaskey & Olds

(57) ABSTRACT

A vehicle suspension system is dynamically adjustable to minimize the effects of energy transfer on a driver, passenger or cargo within a vehicle. Each wheel preferably has a suspension module that includes a force absorbing device with an adjustable force absorbing capacity. A sensor is associated with each wheel that detects an amount of displacement and acceleration of the wheel in response to a force imposed on the vehicle as caused by variations in a road surface, for example. An electronic controller detects the amount of displacement and acceleration of one wheel and activates an electrically activated force imposing device at another wheel to effectively counteract the effect of the force on the one wheel within one millisecond. The force imposing device preferably is a piezoelectric actuator. The vehicle suspension system of this invention is dynamically adjustable and compensates for variations in a road surface, for example, while the vehicle is in transit.

24 Claims, 3 Drawing Sheets

MICROPROCESSOR CONTROLLED VEHICLE SUSPENSION

BACKGROUND OF THE INVENTION

This invention generally relates to vehicle suspensions. More particularly, this invention relates to an electronically controlled vehicle suspension that is dynamically adjustable while the vehicle is in motion.

A variety of vehicle suspension systems are known. Typical passenger vehicles include basic suspension systems while heavy duty vehicles sometimes include more complex systems having adjustable features. For example, the amount of air within hydraulic shock absorbers can be adjusted to provide a firmer or softer ride. The limitations on such systems, however, include the fact that the adjustment can only be made when the vehicle is stationary (i.e., no dynamic adjustments are possible while the vehicle is in motion). Conventional systems are not capable of adjusting the suspension system in response to varying road conditions while the vehicle is in transit.

Heavy duty vehicles present special considerations including the need to reduce the amount of energy transferred to the driver of the vehicle. The large masses associated with heavy duty vehicles typically require suspension systems that support the loads but, at the same time, render the vehicle relatively uncomfortable for a driver. The typical experience of a driver of a heavy duty vehicle includes an excessive amount of vibration or bouncing of the driver's seat.

Additionally, the cargo within the heavy duty vehicle is typically subjected to undesirably large amounts of energy transfer caused by forces imposed on the vehicle by road conditions. This is especially troublesome when transporting relatively fragile or sensitive cargo.

In view of the shortcomings and drawbacks associated with conventional suspension systems, it would be desirable to provide a suspension system that is dynamically adjustable to compensate for varying road conditions. This invention provides such a suspension system that minimizes the amount of energy transferred to a driver, passenger or cargo within a vehicle that is caused by variations in a road surface, for example. Additionally, a suspension designed according to this invention provides enhanced safety features as will be described below.

SUMMARY OF THE INVENTION

In general terms, this invention is a vehicle suspension system that is dynamically adjustable to minimize the amount of energy transfer to a driver, passenger or cargo within a vehicle. Although this invention is especially useful for heavy duty vehicles, the application of this invention is not necessarily limited to such vehicles.

A suspension system designed according to this invention includes several basic components. A force absorbing device has an adjustable force absorbing capacity. A sensor is provided that detects a force imposed on a first portion of the suspension system while the vehicle is travelling along a road surface. An electronic controller is in communication with the sensor and the force absorbing device. The electronic controller determines an amount of displacement and an amount of acceleration of the first portion of the suspension system such as a wheel, based upon an output of the sensor. An electrically activated force imposing device imposes a force on a second portion of the suspension system responsive to the electronic controller such that the effects of the force imposed on the first portion of the suspension system that otherwise would be imposed on the driver or cargo is minimized.

The electrically activated force imposing device preferably is a piezoelectric actuator that is responsive to a command from the electronic controller within approximately one millisecond of the recognition of the force imposed on the first vehicle wheel. The force imposed by the piezoelectric actuator effectively counteracts the force from the road and improves the comfort and consistency of the ride of the vehicle. Additionally, the force absorbing device preferably has an air chamber with an inlet and an outlet so that an amount of air within the chamber can be selectively adjusted through commands from the electronic controller to adjust the force absorbing capacity of the suspension system.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
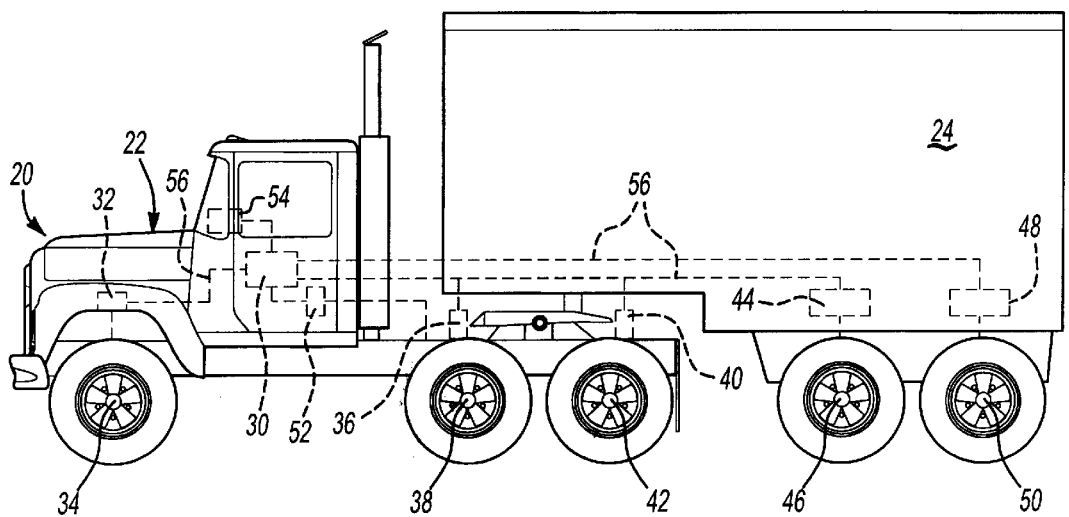
FIG. 1 diagrammatically and schematically illustrates a vehicle having a suspension system designed according to this invention.

FIG. 1 illustrates a heavy duty vehicle 20 having a cab portion 22 and a trailer portion 24. The heavy duty vehicle 20 is a conventional truck except that it includes a suspension system designed according to this invention.

The suspension system includes an electronic controller 30 that is responsible for monitoring and processing all signals within the suspension system and for automatically implementing adjustments to the system as will be described below. The controller preferably is programmed to utilize a vehicle dynamic model as known in the art. The suspension system preferably includes a plurality of suspension modules, each associated with one of the wheels of the vehicle. A first suspension module 32 is associated with a first wheel 34 near the front of the cab portion 22. A suspension module 36 is associated with the wheel 38 while a suspension module 40 is associated with the wheel 42. At the rear end of the trailer portion 24, two axles supporting wheels are illustrated. A suspension module 44 is associated with the wheel 46 and a suspension module 48 is associated with the wheel 50. Only one side of the vehicle 20 is illustrated but both sides include wheels and associated suspension modules.

It should be noted that the individual suspension modules can be associated with a single wheel or an entire axle of the vehicle, depending on the needs of a particular situation. Moreover, although a heavy duty vehicle is illustrated in FIG. 1, this invention is not limited to applications for heavy duty vehicles.

The suspension system designed according to this invention preferably also includes a sensor 52 associated with the driver seat of the vehicle. The sensor 52 preferably is a vertical accelerometer that detects an acceleration and amount of displacement of a portion of the vehicle adjacent a base of the driver's seat. A driver interface module 54 preferably is provided within the cab portion 22. The communication between the various components of the suspension systems and the electronic controller 30 is schematically illustrated in FIG. 1 by the communication lines 56.

Figure 2:
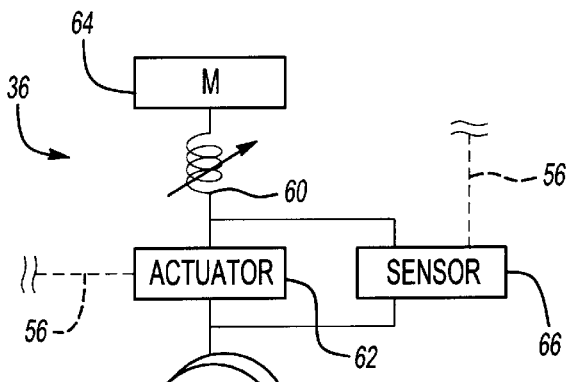
FIG. 2 schematically illustrates a suspension module designed according to this invention.

FIG. 2 schematically illustrates an example suspension module. A force absorbing device 60 (i.e., a shock absorber) preferably includes an adjustable force absorbing capacity. A force imposing device 62 preferably is coupled between the force absorbing device 60 and the wheel 38. The force imposing device 62 preferably is electrically activated and most preferably is a piezoelectric actuator. Alternatively, a solenoid actuator can be utilized as the force imposing device 62. A piezoelectric actuator or solenoid actuator are preferable because they can respond to a command from the electronic controller 30 in a relatively short time. The piezoelectric actuator is most preferred because its response time is typically two or three times faster than that of a solenoid (i.e., on the order of 100 microseconds versus approximately 300 microseconds). In the preferred embodiment, the response time of the force imposing device 62 preferably is within one millisecond. Piezoelectric actuators and solenoid actuators are well known in the art and. Given this specification, those skilled in the art will be able to choose devices that meet the requirements of a particular situation and to arrange them to accomplish the results provided by this invention.

The mass 64 schematically represents a mass of a driver or cargo within the vehicle 20. A sensor 66 is provided for detecting an amount of force imposed on the wheel 38 as caused by variations in the road surface, for example. The sensor 66 preferably is a vertical accelerometer that detects an amount of displacement and acceleration of the wheel 38 responsive to a force imposed on the vehicle by the road surface, for example. Vertical accelerometers are known in the art and, therefore, need not be further described in this specification. The vertical accelerometer 66 preferably is coupled to the suspension module 36 in a manner that it detects the amount of displacement and acceleration of the wheel 38, or another selected portion of the suspension module 36. The mass 64 is known or can be determined. The acceleration information from the sensor 66, therefore, makes it possible to determine an incident force on any chosen portion of the suspension system (i.e., f=ma).

An alternative example includes a strain gauge as the sensor 66. Strain gauges are known in the art. With strain gauges, the incident force can be measured directly.

Alternatively, the incident acceleration can be used without determining the incident force. When that strategy is implemented, the piezoelectric actuator 62 is controlled to introduce a counteractive acceleration.

Figure 3:
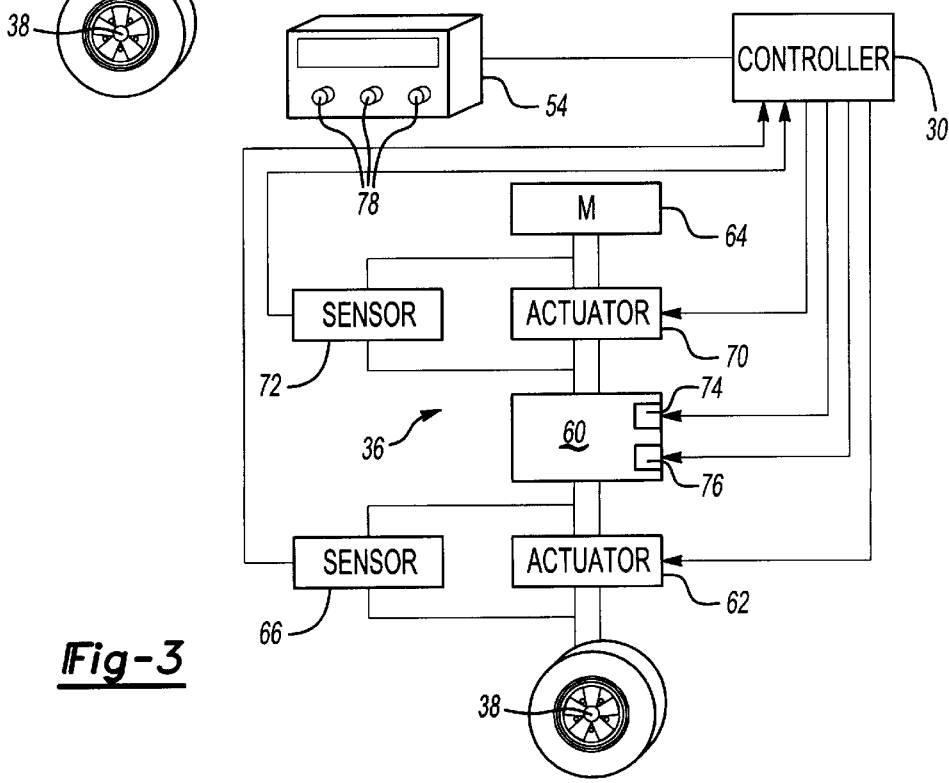
FIG. 3 schematically illustrates, in somewhat more detail, a vehicle suspension module designed according to this invention.

Referring now to FIG. 3, the suspension module 36 includes the force absorbing device 60, the electrically activated force imposing device 62 and the sensor 66 as generally shown in FIG. 2. Additionally, a second force imposing device 70 and a second sensor 72 preferably are coupled between the force absorbing device 60 and the mass 64. Accordingly, the vehicle suspension module 36 can be described as having a first end at the wheel 38 and a second end directed toward the vehicle (and more specifically, to the mass 64 supported in the vehicle) adjacent the suspension module 36.

The force absorbing device 60 preferably is pneumatic and includes an air chamber that receives a varying amount of air pressure through operation of an inlet 74 and an outlet 76, which preferably are controlled by the electronic controller 30. An air source (not illustrated) for the air chamber can be a conventional air source on a heavy duty vehicle, for example. Additionally, the embodiment of FIG. 3 includes a plurality of switches 78 on the driver interface module 54 that allows a driver to selectively switch the adjustable features of the suspension system on or off, for example.

The operation of the suspension module 36 will be considered as an example of the operation of each of the suspension modules associated with the vehicle suspension system. In the preferred embodiment, each suspension module is independently controllable by the electronic controller 30 but works in combination with the others as will be described below. Therefore, the responsiveness of the suspension system can be varied at each wheel or each axle of the vehicle to achieve a desired effect that can remain uniform throughout the entire interior of the vehicle even though the mass distribution within the vehicle may be uneven.

In operation, the sensor 66 detects a force imposed on the wheel 38 by detecting an acceleration of the wheel 38 caused by a variation in the road surface, for example. The controller 30 processes output signals from the sensor 66 that are indicative of the detected amount of acceleration and displacement. The controller 30 utilizes the sensor information and the vehicle dynamics model and responsively determines whether a counteractive force should be introduced at another suspension module on the vehicle to minimize any effect of the force incident on the wheel 38. When an adjustment is determined to be necessary, the electronic controller 30 activates the force imposing device 62 at the appropriate suspension module to cause a counteractive force to be incident on the suspension system to counteract the effects of the force incident on the wheel 38. In the embodiment illustrated in FIG. 3, the second force imposing device 70 can also be activated to achieve this end. The counteractive force provided by the force imposing devices 62 and 70 effectively balance out the force incident on the vehicle at the first suspension module.

Since the force imposing devices 62 and 70 are electrically activated and preferably are piezoelectric actuators, the response time to the command from the electronic controller 30 preferably is within one millisecond of detecting the displacement and acceleration of the wheel 38. Therefore, the counteractive force is automatically and nearly instantaneously provided at one of the wheels in response to the force incident on the wheel 38, for example.

Even though the force absorbing device 60 preferably includes an air inlet 74 and outlet 76, pneumatic components typically are not capable of responding within a time frame that is effective for dynamically counteracting a force imposed on the wheel 38. Therefore, the electrically activated force imposing device included in this invention provides the capability of having a dynamically adjustable system that is effectively instantaneously responsive to forces imposed on the wheels of a vehicle to minimize the effects of such forces on cargo within the vehicle, for example.

As mentioned above, the suspension system preferably allows for independent adjustment of each of the suspension modules but they are adjusted depending on the forces incident at the other wheels. For example, the counteractive force may be introduced at the corresponding wheel on the other side of the vehicle (not illustrated) when the incident force occurs at the wheel 42. The driver interface module 54 preferably allows the driver, through actuation of the switches 78, to selectively activate or deactivate the adjustable function of the suspension system at one or more of the suspension modules. Further, the vehicle operator preferably is provided with the ability to make adjustments to the sensitivity or force absorbing capacity at each of the suspension modules through activation of the switches 78, for example.

An additional feature of this invention includes utilizing the constant mass of the engine at the front portion of the cab 22 as a reference mass. For example, a force incident on the wheel 34 results in a certain displacement and acceleration of the wheel 34 and a certain response by the suspension module 32. Given that the mass of the engine of the vehicle 22 is effectively constant, that information preferably is utilized by the electronic controller 30 to determine the potential effect of the force incident on the wheel 34 will have on the driver of the vehicle and any cargo contained within the trailer portion 24 as the wheels 38, 42, 46 and 50 encounter the variation in the road surface that the wheel 34 encountered. This information preferably is utilized by the electronic controller 30 to more accurately determine what adjustments should be made to the suspension modules 36, 40, 44 and 48, respectively.

Figure 4:
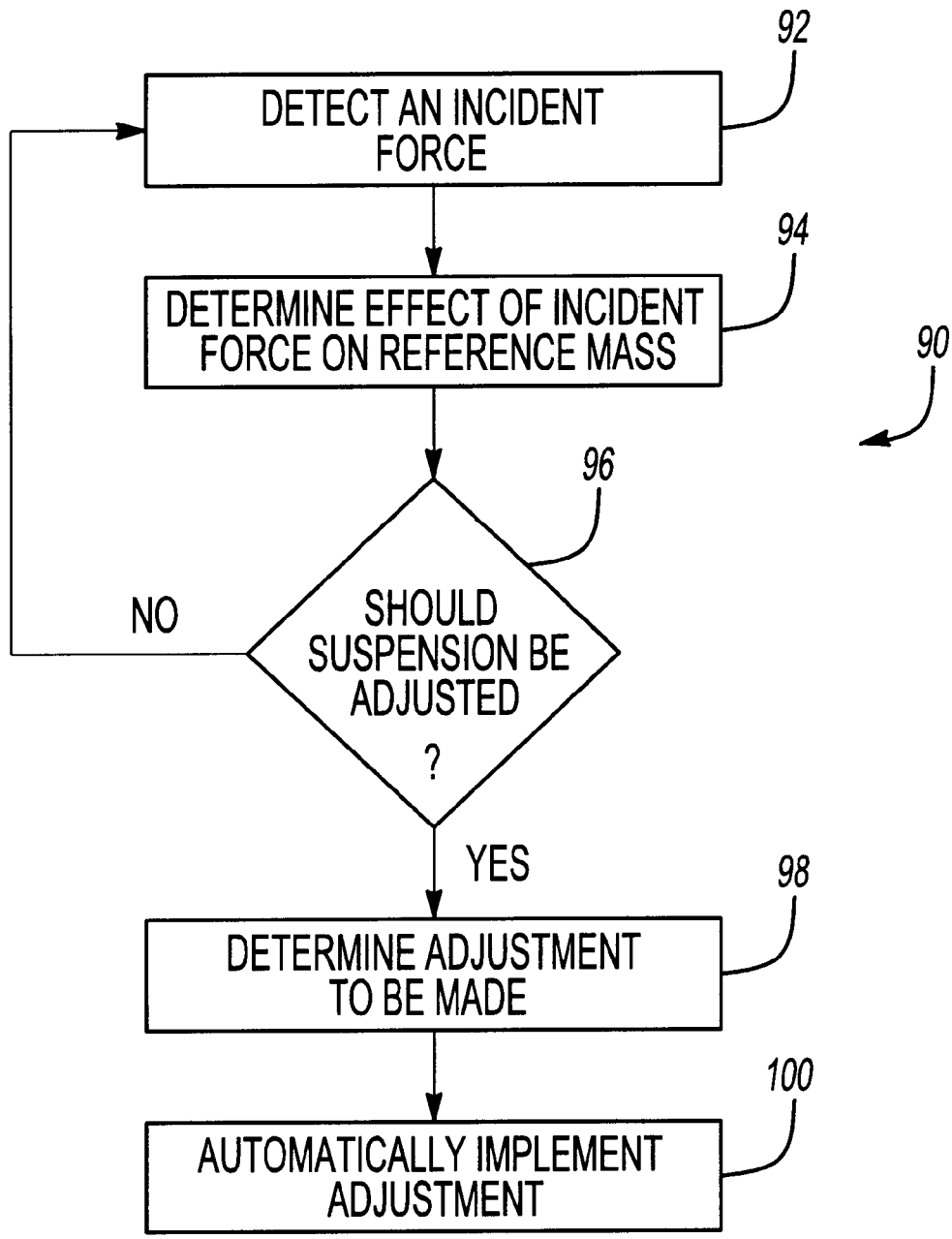
FIG. 4 is a flow chart diagram illustrating a method of controlling a vehicle suspension designed according to this invention.

FIG. 4 graphically illustrates a summary of the preferred method of controlling a suspension system designed according to this invention in a flow chart 90. As a first step at 92, the sensors 66 and 72 are utilized to detect an incident force that is imposed on at least one of the wheels of the vehicle, for example. Preferably, all wheels are simultaneously and continuously monitored. A second step at 94 includes determining the effect of the incident force on a reference mass. This can be accomplished, for example, as just described with regard to the effect of an incident force on the relatively constant, reference mass of the vehicle engine.

At 96, the electronic controller 30 determines whether the suspension should be adjusted to minimize the effect of the incident force on a mass supported by the vehicle (such as the driver or cargo, for example). If the incident force is of such a magnitude that no adjustment need be made, the electronic controller 30 simply continues monitoring output signals from the sensors 66 and 72. The preferred embodiment includes giving the driver the ability to adjust the threshold that must be exceeded before a counteractive force is introduced. The determinations made at steps 94 and 96 preferably include utilizing the vehicle dynamics model.

If a suspension adjustment should be made, the electronic controller 30 preferably automatically determines the amount of adjustment to be made at 98. The electronic controller 30 then automatically implements the adjustment, which preferably is accomplished by activating at least one of the force imposing devices 62 and 70 at another wheel. Where piezoelectric actuators are used, they can be activated in one of two directions to either cause an effective expansion or contraction of the suspension to counteract the incident force. The response time for performing steps 98 and 100 after performing step 92 preferably is within one millisecond.

It should be noted that the step 94 is optional and need not be included to control or operate a dynamically adjustable suspension system designed according to this invention.

Figure 5:
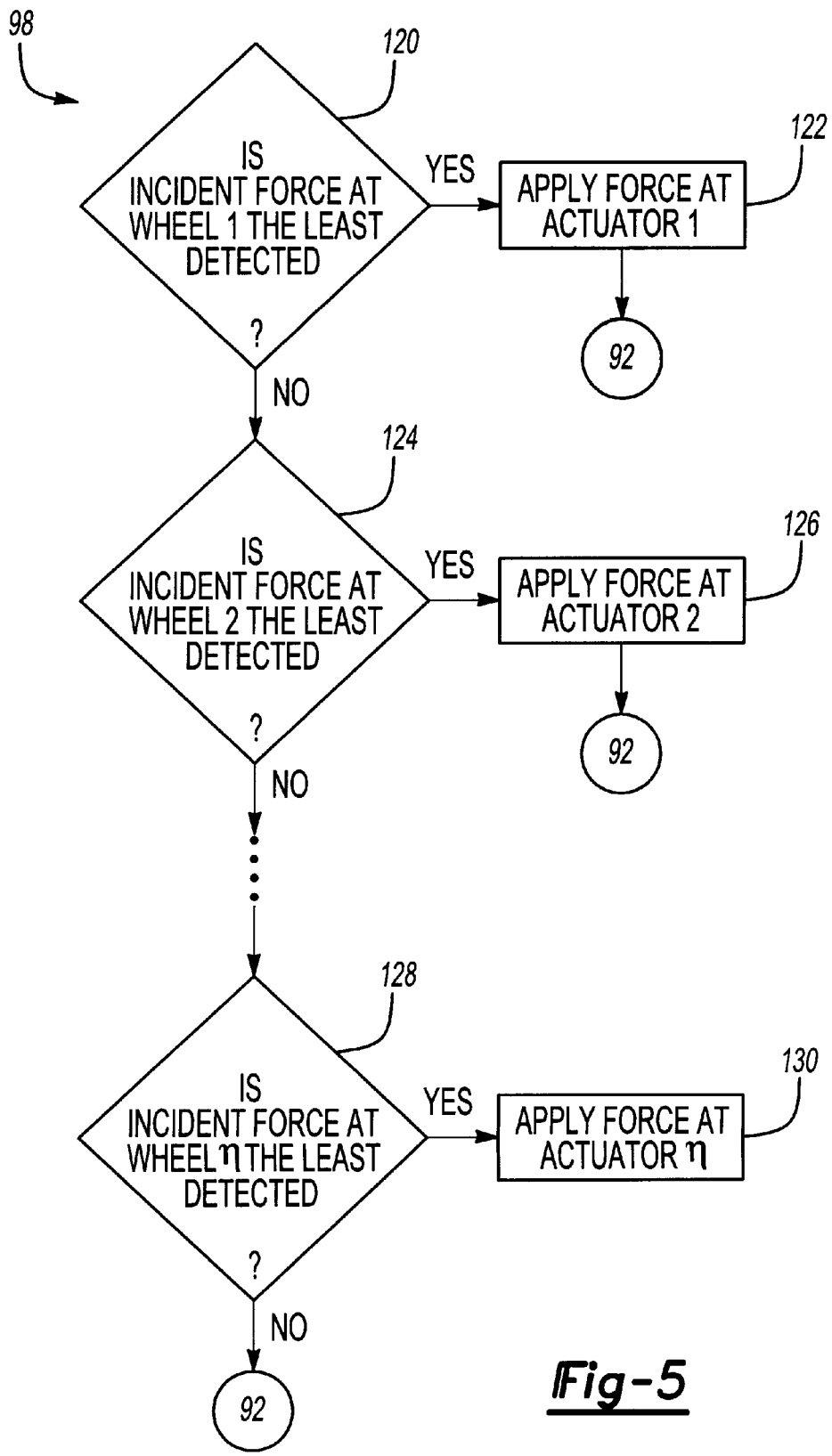
FIG. 5 is a flow chart diagram illustrating more details of a selected portion of FIG. 4.

FIG. 5 illustrates a flow chart providing more details of the preferred method of performing the step at 98 from FIG. 4. Determining the counteractive force (i.e., the adjustment to the suspension system) preferably is accomplished by continuously monitoring the output of the sensors 66 at each wheel. That information is then implemented through a vehicle dynamics model, for example, to determine which one of the suspension modules should experience a counteractive force to minimize the effects of an incident force on another one of the wheels. This can be accomplished in a variety of ways. The following sets forth an example implementation, which is the currently preferred strategy.

Basically, the electronic controller 30 determines which of the wheels is experiencing the least amount of force and imposes a counteractive force at that wheel. In an example where there are n wheels on a vehicle, the system first determines at 120 whether the force incident at a first one of the wheels is the least amount of force that is detected at a given incident. If that is the least amount of force at any of the wheels, then the electrically activated force actuator associated with the first wheel applies the counteractive force in the determined amount at 122. After the counteractive force is imposed, the system returns to the step 92 in FIG. 4 and continuously monitors the incident force at each of the wheels.

If the force at the first wheel is not the least detected, then the system continues to make a determination at 124 whether a second one of the wheels has the least amount of incident force. If that wheel has the least amount, then the force actuator associated with that wheel is activated at 126 to introduce the counteractive force. Again, once the counteractive is introduced, the system returns to the step 92 from FIG. 4.

The last of the wheels is monitored at 128 in the event that none of the previously checked wheels has the least amount of incident force. If the nth wheel has the least amount of force, then the force actuator associated with that wheel is activated at 130 to apply the counteractive force. If all of the wheels have an equal amount of force, then no adjustment is made (i.e., no counteractive force is introduced).

As can be appreciated, this invention provides the ability to greatly enhance the comfort and stability of the ride experienced by a driver or passenger within a vehicle. Additionally, the amount of vibration experienced by cargo within a heavy duty vehicle, for example, can be minimized. Further, under some circumstances, this invention may enhance the safety of driving a vehicle. For example, when the weight within a vehicle is shifting such that the vehicle may approach a rollover condition, the information from the sensors 66 and 72 can be utilized to introduce a force at one of the suspension modules to counteract the forces that might otherwise cause a rollover accident. In other words, this invention provides the ability to continuously monitor the conditions experienced by the suspension system of a vehicle and to selectively introduce forces on one or more portions of the suspension system to minimize the effect of such forces and to stabilize the vehicle.

The preceding description is by way of example and not limiting in nature. An implementation of this invention has been schematically illustrated and described in terms to enable one skilled in the art to make and use a suspension system designed according to this invention. Variations and modifications to the disclosed embodiment may become apparent to those skilled in the art that do not necessarily depart from the basis of this invention. The scope of legal protection given to this invention can only be determined by studying the following claims.

What is claimed is:

1. A dynamically controllable vehicle suspension system, comprising:

a plurality of wheels;

a plurality of force absorbing devices, each said force absorbing device being associated with one of said wheels;

a sensor that detects a force imposed at said wheels while the vehicle is traveling along a surface;

an electronic controller in communication with the sensor and the force absorbing devices, the electronic controller determining an amount of acceleration of a first one of said wheels based upon an output of the sensor; and a plurality of electrically activated force imposing devices that are each associated with one of said force absorbing devices, and one of said force imposing devices imposing a force at a second one of said wheels responsive to the electronic controller.

2. The system of claim 1, wherein each said force imposing device comprises a piezoelectric actuator.

3. The system of claim 1, wherein each said force imposing device comprises a solenoid actuator.

4. The system of claim 1, wherein the electronic controller determines which one of said force imposing devices to activate by determining the least amount of displacement and acceleration at said wheels and activating the force imposing device associated with the one of said wheels with the least amount of displacement and acceleration.

5. The system of claim 1, wherein the sensor comprises a vertical accelerometer supported by the vehicle such that the sensor detects an amount of displacement of each of said wheels and an acceleration associated with the displacement and wherein the sensor provides at least one signal to the electronic controller indicative of the detected displacement and acceleration.

6. The system of claim 1, wherein each electrically activated force imposing device is positioned between an associated one of the force absorbing devices and a corresponding wheel and wherein the sensor comprises a plurality of accelerometers that respectively detect the force near each wheel.

7. The system of claim 1, wherein the electronic controller simultaneously activates more than one of said electrically activated force imposing devices.

8. The system of claim 1, including a driver interface that allows the driver of the vehicle to selectively adjust characteristics of the system.

9. The system of claim 8, wherein the driver interface allows the driver to selectively deactivate the electrically activated force imposing devices.

10. A method of controlling a vehicle suspension system, comprising the steps of:

(A) detecting an incident force that is imposed on a first portion of the suspension system while the vehicle is travelling along a surface;

(B) determining an amount of adjustment to be made to the suspension system to minimize an effect of the incident force on the vehicle; and (C) automatically imposing a counteractive force on a second portion of the suspension system corresponding to the amount determined in step (B).

11. The method of claim 10, wherein steps (A) through (C) are repeatedly performed dynamically while the vehicle is travelling along the surface.

12. The method of claim 11, wherein the vehicle includes a plurality of axles and wherein steps (A) through (C) are performed at each axle, respectively.

13. The method of claim 10, wherein step (C) is performed within approximately one millisecond of performing step (A) and wherein step (C) includes imposing a counteractive force on the second portion of the suspension system using an electrically activated force imposing device.

14. The method of claim 10, wherein step (A) is performed using a vertical accelerometer and includes determining an amount of acceleration of a wheel associated with the first portion of the suspension system and wherein step (C) is performed to minimize the effect on a mass supported by the vehicle.

15. The method of claim 14, wherein step (B) is performed using an electronic controller and step (C) is performed using a piezoelectric actuator to impose a counteractive force that counteracts the effect of the incident force such that the suspension system absorbs the effect of the incident force which would otherwise have an effect on the vehicle.

16. The method of claim 14, wherein step (B) is performed using an electronic controller and step (C) is performed using a solenoid actuator to impose a counteractive force that counteracts the effect of the incident force such that the suspension system absorbs the effect of the incident force which would otherwise have an effect on the vehicle.

17. The method of claim 10, wherein step (B) is performed by determining which portion of the suspension system has the least amount of incident force and defining the portion having the least amount as the second portion of step (c).

18. The method of claim 10, wherein step (A) is performed by determining an acceleration and an amount of displacement of a wheel of the vehicle.

19. The method of claim 10, wherein steps (B) and (C) are performed for a plurality of different portions of the vehicle such that the suspension system is adjusted in a manner that provides different amounts of minimization of the incident force for the different portions of the vehicle.

20. A vehicle, comprising:

a plurality of wheels;

a plurality of suspension modules corresponding to the plurality of wheels, each suspension module including a sensor that detects a force incident on the corresponding wheel, a force absorbing device to absorb at least a portion of the incident force and an electrically activated force imposing device; and an electronic controller coupled to each of the suspension modules and in communication with each of the sensors and each of the electrically activated force imposing devices such that the electronic controller determines an incident force on a first one of said wheels and causes at least one of said force imposing devices associated with a second one of said wheels to introduce a counteractive force at the second wheel responsive to the incident force while the vehicle is traveling along the surface.

21. The vehicle of claim 20, wherein the sensors comprise vertical accelerometers and the electrically activated force imposing devices each comprise one of a piezoelectric actuator or a solenoid actuator.

22. The vehicle of claim 20, wherein each electrically activated force imposing device is positioned between the corresponding force absorbing device and the corresponding wheel, such that each electrically activated force imposing device imposes the counteractive force on the suspension system between the corresponding wheel and the corresponding force absorbing device.

23. The vehicle of claim 20, including a driver interface that allows the driver to selectively adjust the performance of the suspension modules.

24. The vehicle of claim 23, wherein the driver interface allows the driver to selectively deactivate the electrically activated force imposing devices.

\* \* \* \* \*